United States Patent
Karube et al.

(10) Patent No.: US 9,452,789 B2
(45) Date of Patent: Sep. 27, 2016

(54) PERIPHERAL STRUCTURE OF FRONT HOOD OF VEHICLE

(71) Applicant: HONDA MOTOR CO., LTD., Tokyo (JP)

(72) Inventors: Shinichi Karube, Wako (JP); Takahiro Katsuta, Tochigi (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/672,951

(22) Filed: Mar. 30, 2015

(65) Prior Publication Data

US 2015/0274212 A1  Oct. 1, 2015

(30) Foreign Application Priority Data

Mar. 31, 2014 (JP) ................................. 2014-073706

(51) Int. Cl.
| | |
|---|---|
| *B62D 25/14* | (2006.01) |
| *B62D 25/12* | (2006.01) |
| *B62D 25/18* | (2006.01) |
| *B62D 23/00* | (2006.01) |
| *B62D 25/08* | (2006.01) |

(52) U.S. Cl.
CPC ............. *B62D 25/12* (2013.01); *B62D 23/005* (2013.01); *B62D 25/082* (2013.01); *B62D 25/14* (2013.01); *B62D 25/18* (2013.01)

(58) Field of Classification Search
CPC .... B62D 25/12; B62D 25/082; B62D 25/14; B62D 25/18; B62D 23/005
USPC ........... 296/193.11, 192, 187.04, 187.09, 70, 296/74
See application file for complete search history.

(56) References Cited

U.S. PATENT DOCUMENTS

| | | | |
|---|---|---|---|
| 4,938,526 A * | 7/1990 | Sannomiya ........... | B60S 1/0402 15/250.16 |
| 7,527,319 B2 | 5/2009 | Ball et al. | |
| 2008/0023249 A1* | 1/2008 | Sunsdahl ............. | B62D 21/183 180/312 |

* cited by examiner

*Primary Examiner* — Joseph D Pape
(74) *Attorney, Agent, or Firm* — Squire Patton Boggs (US) LLP

(57) ABSTRACT

A peripheral structure of a front hood of a vehicle comprises an instrument panel arranged in a front part of a riding space and includes a first surface facing the riding space and a second surface extending diagonally forwardly and downwardly from an upper end of the first surface, and an openable and closable or detachable front hood extending forwardly of the second surface and covering from above a storage compartment which is arranged in front of the riding space and between a pair of left and right front wheels. The instrument panel has an extension section being located along the second surface and extending diagonally forwardly and downwardly under a rear end of the front hood. A step section is provided at a front end portion of the extension section and projects upwardly from an upper surface which is located in the rear of the front and portion.

10 Claims, 13 Drawing Sheets

PERIPHERAL STRUCTURE OF FRONT HOOD OF VEHICLE

BACKGROUND

1. Field

The present invention relates to a peripheral structure of a front hood of a vehicle.

2. Description of the Related Art

A peripheral structure of a front hood of a vehicle is disclosed in a patent reference 1 (U.S. Pat. No. 7,527,319), for example. In this peripheral structure, pillars for supporting a roof are provided at each side of an instrument panel of a golf cart.

Although, there is no description of rainwater which falls on the peripheral structure of the instrument panel in the patent reference 1. However, in the vehicle which is not provided with a windshield, when the rainwater falls on the instrument panel and a front hood which is continuous with a front part of the instrument panel, there may be cases where the rain water flows into a joint between the instrument panel and the front hood. In the case where a storage compartment is provided under the front hood, once the rainwater enters the joint, it flows into the storage compartment, and so, it is undesirable. Therefore, there is a need to provide a structure capable of preventing the rainwater from flowing into the storage compartment located under the front hood.

SUMMARY

The present invention has an objective of preventing the rainwater from flowing into a storage compartment under a front hood in a peripheral structure of the front hood of a vehicle in which a joint between an instrument panel and the front hood is exposed externally of the vehicle.

According to a first embodiment of the present invention, there is provided a peripheral structure of a front hood of a vehicle comprising an instrument panel being arranged in a front part of a riding space and including a first surface facing the riding space and a second surface extending diagonally forwardly and downwardly from an upper end of the first surface, and an openable and closable or detachable front hood extending forwardly of the second surface and covering from above a storage compartment which is arranged in front of the riding space and between a pair of left and right front wheels. The instrument panel has an extension section being located along the second surface and extending diagonally forwardly and downwardly under a rear end of the front hood, and a step section is provided in a front end portion of the extension section and projects more upwardly than an upper surface located in the rear of the front end portion.

According to a second embodiment of the present invention, the peripheral structure of the front hood of the vehicle further comprises a front fender including a pair of left and right fender sections located adjacent to left and right lateral ends of the front hood and configured to cover the pair of left and right front wheels from above, and the storage compartment connecting integrally and continuously the pair of left and right fender sections. Rear ends of the pair of left and right fender sections of the front fender are arranged continuously and side by side with the rear end of the front hood in the vehicle width direction, and the front end portion of the extension section of the instrument panel is arranged under the rear ends of the pair of left and right fender sections and the rear end of the front hood. The step section extends continuously in the vehicle width direction, and at least both ends in the vehicle width direction of the step section are covered with the pair of left and right fender sections in a top plan view. At least a rear end of the storage compartment around the middle in the vehicle width direction thereof is located under the second surface, and both end portions in the vehicle width direction of the storage compartment which overlaps with the step section in a top plan view are positioned inwardly from both ends in the vehicle width direction of the step section.

According to a third embodiment of the present invention, electrical equipment is arranged in a rear lower position of at least one of the pair of left and right fender sections, and the extension section of the instrument panel extends to a position in front of and above the electrical equipment under the fender section.

According to a fourth embodiment of the present invention, the second surface of the instrument panel is formed in a convex shape which projects diagonally forwardly and upwardly at the middle in the vehicle width direction as against both sides in the vehicle width direction.

According to a fifth embodiment of the present invention, the front fender is arranged adjacent to the left and right lateral ends of the front hood, and each of the front hood and the front fender extends continuously in the diagonally forward and downward direction from the rear end to a front end thereof.

According to the first embodiment of the present invention, even if the rainwater flows into a joint between the instrument panel and the front hood, the rainwater having flown into the joint flows forwardly and downwardly along the extension section of the second surface and is dammed up by the step section in the end. Therefore, it is possible to prevent the rainwater from flowing into the storage compartment under the front hood.

According to the second embodiment of the present invention, even if the rainwater dammed up by the step section flows downwardly from both ends of the step section, the rainwater flows out to the outside of the storage compartment. Therefore, it is possible to prevent the rainwater from flowing into the storage compartment.

According to the third embodiment of the present invention, the rainwater which flows forwardly and downwardly along the extension section of the second surface is guided forwardly of the electrical equipment under the fender section. Therefore, the rainwater can be prevented from falling and splashing on to the electrical equipment.

According to the fourth embodiment of the present invention, the rainwater is hardly collected in the middle in the vehicle width direction of the instrument panel. In particular, the rainwater is distributed to the left and to the right in the vehicle width direction by the traveling air. Therefore, an amount of the rainwater flowing into the joint between the instrument panel and the front hood can be decreased.

According to the fifth embodiment of the present invention, since the rainwater falling on the front hood and the front fender flows forwardly, the rainwater which flows into the joint between the instrument panel and the front hood is limited substantially to the rainwater falling on the instrument panel. Therefore, the amount of the rainwater flowing into the joint between the instrument panel and the front hood can be decreased.

DETAILED DESCRIPTION

Figure 1:
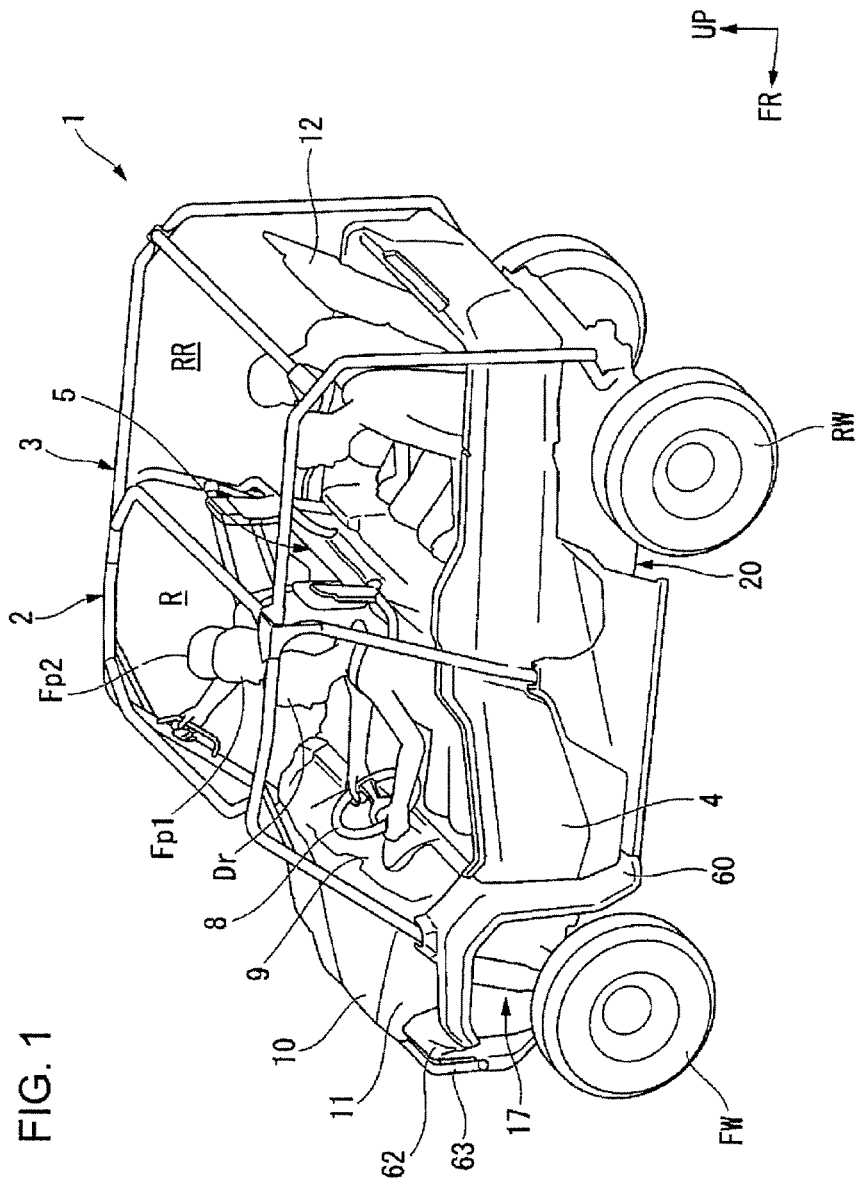
FIG. 1 is a perspective view, as seen from the rear and upper left side, of a vehicle in accordance with an embodiment of the present invention.

Hereinafter, embodiments of the present invention will be explained with reference to accompanying drawings.

In the following description, the orientation such as front, rear, left, right or the like shall be identical to the orientation of a vehicle to be explained hereunder, unless otherwise stipulated. Moreover, in proper places in the drawings to be used in the following explanation, there are designated an arrow FR indicating the forward direction of the vehicle, an arrow LH indicating the left direction of the vehicle and an arrow UP indicating the upward direction of the vehicle. In addition, a line CL in the drawing indicates a center line in the left and right direction of the vehicle.

According to an embodiment, a four-wheeled vehicle 1 (hereinafter, referred to simply as a "vehicle 1") shown in FIG. 1 is a side by side type MUV (multi utility vehicle) in which three occupants Dr, Fp1, Fp2 ride side by side in the vehicle width direction in a front seat. The vehicle 1 is provided with a pair of left and right front wheels FW functioning as a steering wheel on each of left and right sides in a vehicle front part and with a pair of left and right rear wheels RW functioning as a driving wheel on each of left and right sides in a vehicle rear part.

The vehicle 1 has a body 2 which defines a riding space R. The body 2 includes a roll bar 3, a door 4, an instrument panel 9, a vehicle body frame 20 and the like.

The roll bar 3 is located in an upper position of the body 2. The roll bar 3 is made of a steel tube, a steel plate or a synthetic resin and surrounds the riding space R.

The doors 4 are located in left and right lateral end positions in the vehicle width direction. The doors 4 cover left and right lateral sides of the riding space R.

The instrument panel 9 is located in a front part of the body 2. The vehicle body frame 20 is located in a lower part of the body 2.

A seat 5 is arranged in the riding space R. A steering wheel 8 and the instrument panel 9 are arranged in a front part of the riding space R and in front of the seat 5. In front of the instrument panel 9 there is arranged a front hood 10 which is continuous with a front part of the instrument panel 9. On left and right lateral sides of the front hood 10 there is arranged a front fender 11 which is continuous with left and right lateral portions of the front hood 10.

A pair of left and right front mudguards 60 is arranged on left and right lateral portions of the front fender 11. A pair of left and right head lamps 62 is arranged between a front portion of the front fender 11 and each of front portions of the left and right mudguards 60. A front bumper 63 is arranged in a front end portion of the vehicle 1.

In a rear part of the riding space R and at the rear of the seat 5, there is formed a rear space RR serving as a luggage compartment or a rear riding space. In FIG. 1, two rear occupants ride side by side in the vehicle width direction in a seat (not shown) which is exposed externally by opening a floor plate 12 on which the luggage is placed.

Figure 2:
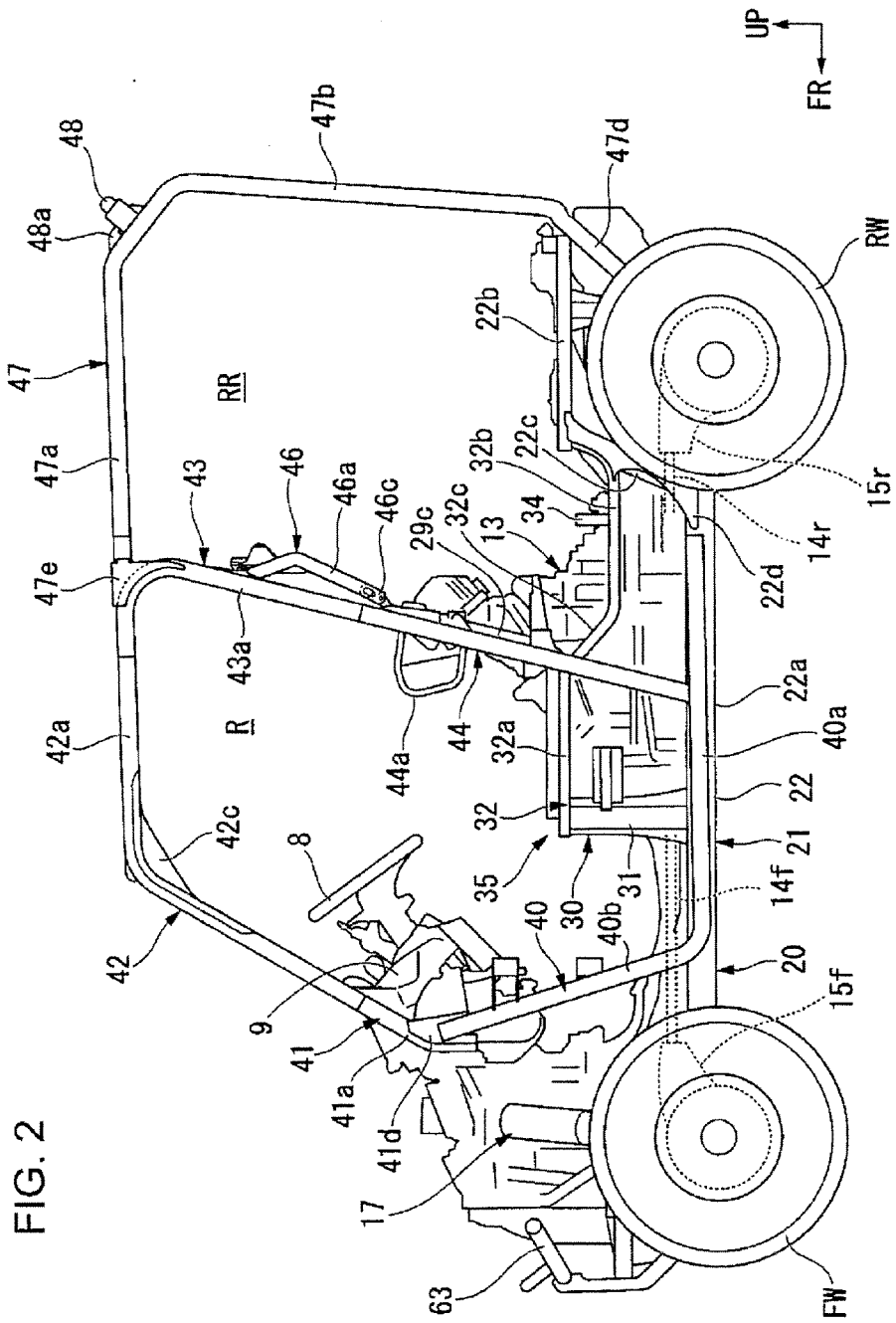
FIG. 2 is a left side view of the above vehicle.
Figure 3:
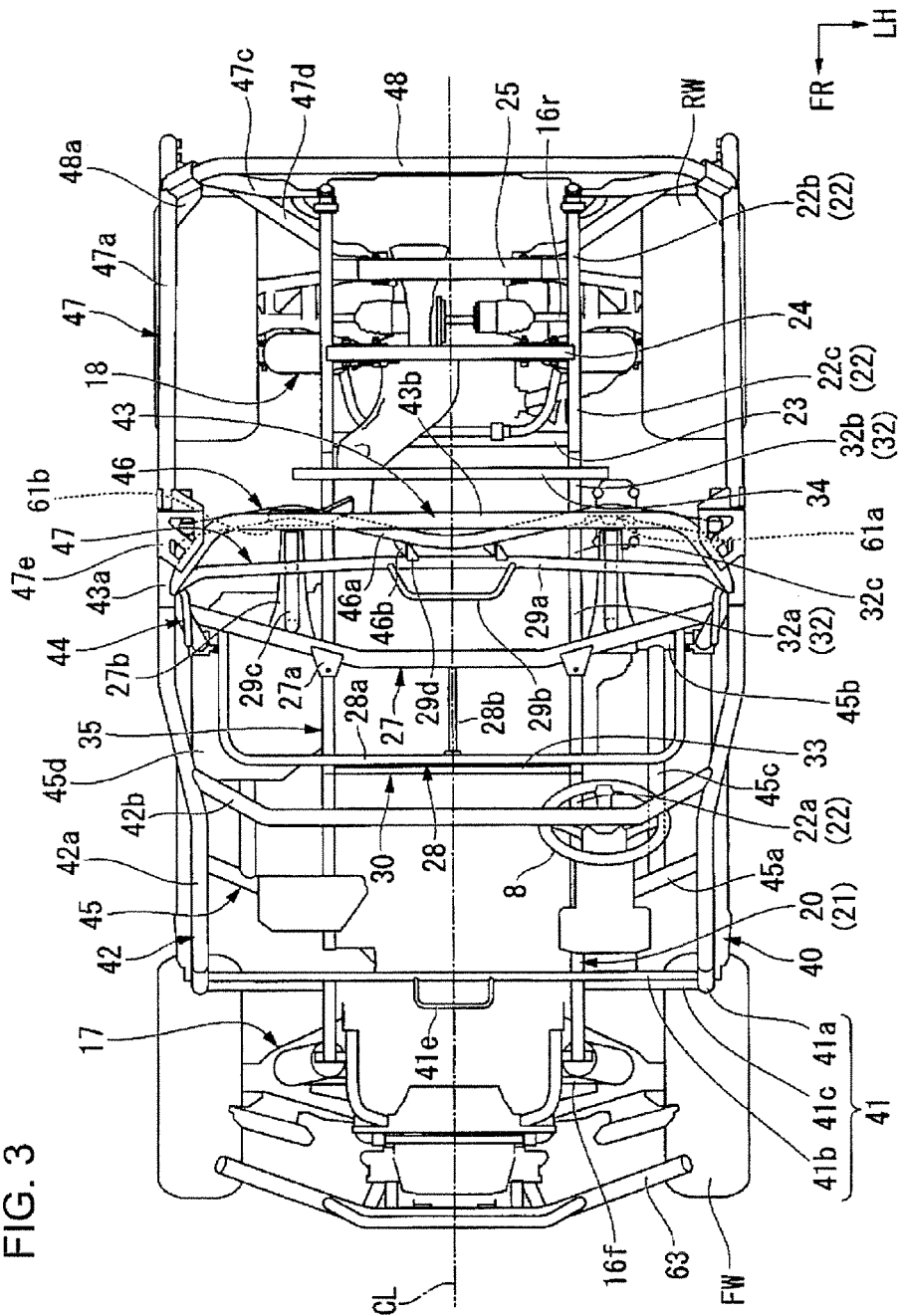
FIG. 3 is a top plan view of the above vehicle.

Referring to FIGS. 2 and 3, under and to the rear of the seat 5 there is arranged a drive unit 13 for travelling which is supported by the vehicle body frame 20. The drive unit 13 uses at least one of an internal combustion engine and an electric motor as a driving motor. The drive unit 13 is configured to output its driving force to a front side propeller shaft 14*f* and a rear side propeller shaft 14*r*, respectively.

The front side propeller shaft 14*f* is connected to a front side differential gear mechanism 15*f* supported on a front part of the vehicle body frame 20. The rear side propeller shaft 14*r* is connected to a rear side differential gear mechanism 15*r* supported on a rear part of the vehicle body frame 20. A front side drive shaft 16*f* (see FIG. 3) extends from the front side differential gear mechanism 15*f* and is connected to the left and right front wheels FW. A rear side drive shaft 16*r* (see FIG. 3) extends from the rear side differential gear mechanism 15*r* and is connected to the left and right rear wheels RW.

The vehicle body frame 20 includes a frame main body 21, a sub-frame 30, a center cross frame 27 (see FIG. 3), a seat cushion frame 28 (see FIG. 3) and a seat back frame 29 (see FIG. 3). The vehicle body frame 20 is constituted by integrally connecting the sub-frame 30, the center cross frame 27, the seat cushion frame 28 and the seat back frame 29 each of which is separated, to front and rear middle portions of the frame main body 21 containing a pair of left and right side frames 22, by means of bolts, etc.

The frame main body 21 is formed by integrally joining various kinds of angular steel tubes to one another by welding and the like. The left and right side frames 22 extend in the forward and rearward direction at inward sides in the vehicle width direction located inwardly from a pair of left and right side roll bars 40 constituting the body 2. The left and right side frames 22 extend rectilinearly in a top plan view.

Each of the left and right side frames 22 includes a center section 22*a*, a rear section 22*b* and a step section 22*c*. The center sections 22*a* are arranged in parallel with each other on the insides in the vehicle width direction of the left and right side roll bars 40 and extend in the forward and rearward direction. The rear sections 22*b* are located to the rear of the center sections 22*a*. The rear sections 22*b* are offset upwardly from the center sections 22*a* in the lower part of the rear space RR and extend in the forward and rearward direction. Each of the step sections 22*c* provides a connection between a middle portion in the forward and rearward direction of a rear part of the center section 22*a* and a front end of the rear section 22*b*.

A pair of left and right gussets 22*d* (see FIG. 2) is fixedly attached to the middle portions in the forward and rearward direction of the rear parts of the center sections 22*a*, the step sections 22c and the front ends of the rear sections 22b in such a way as to extend over them.

A rear lower cross frame 23 (see FIG. 3) which is formed in a rectangular cross section and lengthened in the leftward and rightward direction extends between front lower end portions of the step sections 22c of the left and right side frames 22. A first rear upper cross frame 24 formed in a rectangular cross section and lengthened in the leftward and rightward direction extends between front end portions of the rear sections 22b of the left and right side frames 22. A second rear upper cross frame 25 formed in a rectangular cross section and lengthened in the leftward and rightward direction extends between rear end portions of the rear sections 22b of the left and right side frames 22. A rear end cross frame (not shown) formed in a rectangular cross section and lengthened in the leftward and rightward direction extends between rear end portions of the center sections 22a of the left and right side frames 22.

The sub-frame 30 is formed by integrally joining various kinds of angular steel tubes to one another by welding and the like. The sub-frame 30 includes a pair of left and right lower sub-side frames 31, a pair of left and right upper sub-side frames 32, a first upper cross frame 33 and a second upper cross frame 34. Each of the left and right lower sub-side frames 31 extends substantially vertically in the upward direction from an intermediate portion in the forward and rearward direction of each front part of the center sections 22a of the left and right sub-frames 22.

Each of the left and right upper sub-side frames 32 includes a center section 32a, a rear section 32b and a step section 32c. The center section 32a is arranged in a position overlapping with a middle portion in the forward and rearward direction of each of the center sections 22a of the left and right side frames 22 in a top plan view and extends in the forward and rearward direction. The rear section 32b is arranged in a position overlapping with the middle portion in the forward and rearward direction of the rear part of each of the center sections 22a of the left and right side frames 22. The rear section 32b is offset downwardly from the center section 32a and extends in the forward and rearward direction. A rear end portion of the rear section 32b is connected to a middle portion in the upward and downward direction of each of the step sections 22c of the left and right side frames 22. The step section 32c provides a connection between a rear end of the center section 32a and a front end of the rear section 32b.

The first upper cross frame 33 is formed in a rectangular cross section and lengthened in the leftward and rightward direction so as to extend between front end portions of the left and right upper sub-side frames 32. The second upper cross frame 34 is formed in a rectangular shape and lengthened in the leftward and rightward direction so as to extend between rear end portions of the left and right upper sub-side frames 32.

A box structure 35 as a whole is formed by the center sections 22a of the left and right side frames 22, the left and right lower sub-side frames 31, the left and right upper sub-side frames 32, the first upper cross frame 33 and the second upper cross frame 34. The drive unit 13 is able to be installed on the inside of the box structure 35.

The center cross frame 27 is located above the left and right upper sub-side frames 32 and formed in a rectangular cross section. The center cross frame 27 is lengthened in the leftward and rightward direction so as to extend between middle portions in the upward and downward direction of left and right center side roll bars 44 to be referred to below. A middle portion in the vehicle width direction of the center cross frame 27 extends in a rectilinear fashion in the vehicle width direction in a top plan view. Outer side portions in the vehicle width direction of the center cross frame 27 are inclined in a top plan view in such a condition as to be located to the rear in the forward and rearward direction of the vehicle with approach toward the outer sides in the vehicle width direction thereof.

A pair of left and right gussets 27a (see FIG. 3) is fixedly attached to the outer portions in the vehicle width direction of the center cross frame 27 and the center sections 32a of the left and right upper sub-side frames 32 in such a way as to extend between them.

The seat cushion frame 28 has a main body section 28a and a connecting section 28b. The main body section 28a is located above the left and right upper sub-side frames 32 and formed in a rectangular cross section. The main body section 28a extends in the leftward and rightward direction so as to connect left and right outer side portions in the vehicle width direction of the center cross frame 27. The main body section 28a is of U-shape in a top plan view. The connecting section 28b provides a connection between a middle portion in the vehicle width direction of the main body section 28a and a middle portion in the vehicle width direction of the center cross frame 27. The connecting section 28b extends rectilinearly in the forward and rearward direction of the vehicle in a top plan view.

The seat back frame 29 includes a cross section 29a, a support section 29b, a pair of left and right connecting sections 29c, and a pair of left and right joining sections 29d. The cross section 29a is formed in a rectangular cross section and lengthened in the leftward and rightward direction so as to extend between middle portions in the upward and downward direction of the left and right center side roll bars 44 to be referred to below. A middle portion in the vehicle width direction of the cross section 29a is adjacent to a middle portion in the vehicle width direction of a cross section 46a of a center cross roll bar 46 to be referred to below.

The support section 29b is of U-shape which projects forwardly and downwardly from the middle portion in the vehicle width direction of the cross section 29a. Each of the left and right connecting sections 29c is formed in a rectangular cross section and lengthened the upward and downward direction so as to extend between the cross section 29a and the outer side portion in the vehicle width direction of the center cross frame 27.

A pair of left and right gussets 27b (see FIG. 3) is fixedly attached to lower end portions of the left and right connecting sections 29c and the outer side portions in the vehicle width direction of the center cross frame 27 in such a way as to extend between them.

The left and right joining sections 29d project upwardly from the middle portion in the vehicle width direction of the cross section 29a to the cross section 46a of the center cross roll bar 46 to be referred to later.

The left and right front wheels FW are suspended through an independent suspension type (double wishbone type) front suspension 17 from the front part of the vehicle body frame 20. The left and right rear wheels RW are suspended through an independent suspension type (double wishbone type) rear suspension 18 from the rear part of the vehicle body frame 20.

The roll bar 3 is formed by integrally joining various kinds of circular steel tubes by welding and the like. The roll bar 3 includes the pair of left and right side roll bars 40, a front top roll bar 41, a front upper roll bar 42, a center upper roll bar 43, the pair of left and right center side roll bars 44, a lower roll bar 45, the center cross roll bar 46, a pair of left and right rear side roll bars 47, and a rear cross roll bar 48.

The left and right side roll bars 40 extend rectilinearly in the forward and rearward direction of the vehicle in a top plan view. The left and right side roll bars 40 include a pair of left and right lower sections 40a and a pair of left and right front sections 40b.

The left and right lower sections 40a are arranged under the left and right doors 4 and located in a position overlapping with the middle portions in the forward and rearward direction of the center sections 22a of the left and right side frames 22 in a side view in such a way as to extend in the forward and rearward direction.

The left and right front sections 40b are connected to front ends of the left and right lower sections 40a and inclined in a side view in such a condition as to be located forwardly in the forward and rearward direction of the vehicle with approach toward the upper sides thereof.

The front top roll bar 41 includes a pair of left and right top side sections 41a, an upper cross section 41b and a lower cross section 41c.

The left and right top side sections 41a provide a connection between each upper end portion of the front sections 40b of the left and right side roll bars 40 and each lower end portion of front parts of left and right upper side sections 42a of the front upper roll bar 42. Lower portions of the left and right top side sections 41a extend substantially vertically in the upward and downward direction in a side view. Upper portions of the left and right top side sections 41a are inclined in a side view in such a condition as to be located rearwardly in the forward and rearward direction of the vehicle with approach toward the upper sides thereof.

A pair of left and right gussets 41d (see FIG. 2) is fixedly attached in such a way as to extend between lower end portions of the left and right top side sections 41a and upper end portions of front sections 40b of the left and right side roll bars 40.

The upper cross section 41b is formed in a circular cross section and lengthened in the leftward and rightward direction so as to extend between upper end portions of the left and right top side sections 41a.

The lower cross section 41c is formed in a circular cross section and lengthened in the leftward and rightward direction so as to extend between lower end portions of the left and right top side sections 41a.

The front upper roll bar 42 includes a pair of left and right upper side sections 42a and a cross section 42b.

The left and right upper side sections 42a are arranged in left and right lateral parts in the vehicle width direction of the riding space R. Front portions of the left and right upper side sections 42a are inclined in a side view in such a condition as to be located forwardly in the forward and rearward direction of the vehicle with approach toward the lower sides thereof. Rear portions of the left and right upper side sections 42a are connected to rear ends of the front portions of the left and right upper side sections 42a and extend substantially horizontally in the forward and rearward direction in a side view.

A pair of left and right gussets 42c (see FIG. 2) is fixedly attached in such a way as to extend between the rear ends of the front portions of the left and right upper side sections 42a and the front ends of the rear portions of the left and right upper side sections 42a.

The left and right upper side sections 42a, in a top plan view, start from the connecting portions with the left and right top side sections 41a and extend rectilinearly in the forward and rearward direction of the vehicle. Then, those are bent outwardly in the vehicle width direction from the near sides of connecting portions with the cross section 42b and inclined outwardly to the rear. Thereafter, the left and right upper side sections 42a extend rectilinearly in the forward and rearward direction of the vehicle at a location in the vicinity of connecting portions with a cross section 43b of the center upper roll bar 43.

The cross section 42b is formed in a circular cross section and lengthened in the leftward and rightward direction so as to extend between middle portions in the forward and rearward direction of the left and right upper side sections 42a. A middle portion in the vehicle width direction of the cross section 42b extends substantially horizontally in the vehicle width direction in a top plan view. Left and right outward portions in the vehicle width direction of the cross section 42b are inclined in a top plan view in such a condition as to be located rearwardly in the forward and rearward direction of the vehicle with approach toward the outer sides in the vehicle width direction thereof.

The center upper roll bar 43 includes a pair of left and right center side sections 43a and a cross section 43b.

The left and right side center sections 43a are formed in an L-shape and extend in the upward and downward direction. Front ends of upper portions of the left and right center side sections 43a are connected to rear ends of the rear portions of the left and right upper side sections 42a. Lower portions of the left and right center side sections 43a are inclined in a side view in such a condition as to be located forwardly in the forward and rearward direction of the vehicle as the lower end portions thereof approach the lower sides thereof, and extend rectilinearly.

The cross section 43b is of circular cross section and extends in the leftward and rightward direction so as to extend between front portions of the upper areas of the left and right center side sections 43a. A middle portion in the vehicle width direction of the cross section 43b extends rectilinearly in the vehicle width direction in a top plan view. Left and right outward portions in the vehicle width direction of the cross section 43b are inclined in a top plan view in such a condition as to be located forwardly in the forward and rearward direction of the vehicle with approach toward the outer sides in the vehicle width direction thereof.

The left and right center side roll bars 44 are connected at upper ends thereof to lower ends of the left and right center side sections 43a of the center upper roll bar 43 and connected at lower ends thereof to left and right end portions of a cross section 45b of the lower roll bar 45. The left and right center side roll bars 44 are inclined in a side view in such a condition as to be located forwardly in the forward and downward direction of the vehicle with approach toward the lower sides thereof, and extend rectilinearly in a continuous relationship with the left and right center side sections 43a. In upper areas of the left and right center side roll bars 44 there are provided in a forwardly projecting fashion brackets 44a (see FIG. 2) for supporting the left and right doors 4 (see FIG. 1).

The lower roll bar 45 includes a pair of left and right support sections 45a, the cross section 45b and a pair of left and right connecting sections 45c.

The left and right support sections 45a are of circular cross section and are lengthened in the leftward and rightward direction so as to extend between the left and right lower sections 40a of the left and right side roll bars 40 and the front parts of center sections 22a of the left and right side frames 22. Left and right end portions in the vehicle width direction of the left and right support sections 45a are inclined in a top plan view in such a condition as to be located rearwardly in the forward and rearward direction of the vehicle with approach toward the outer sides in the vehicle width direction thereof.

A pair of left and right gussets 22e (see FIG. 4) is fixedly attached in such a way as to extend between inner end portions in the vehicle width direction of the left and right support sections 45a and the front portions of the center sections 22a of the left and right side frames 22.

The cross section 45b is formed in a circular cross section and lengthened in the leftward and rightward direction so as to extend between rear portions of the left and right lower sections 40a of the left and right side roll bars 40. The cross section 45b extends rectilinearly in the vehicle width direction. A middle portion in the vehicle width direction of the cross section 45b is integrally connected to the frame main body 21 of the vehicle body frame 20 by means of bolts and the like.

The left and right connecting sections 45c are formed in a circular cross section and lengthened in the forward and rearward direction so as to extend between the left and right support sections 45a and outer end portions in the vehicle width direction of the cross section 45b. The left and right connecting sections 45c extend rectilinearly in the forward and rearward direction of the vehicle.

A gusset 45d (see FIG. 3) is fixedly attached in such a way as to extend between a right end portion of the cross section 45b and a rear portion of the right connecting section 45c.

The center cross roll bar 46 includes a cross section 46a and a pair of left and right connecting sections 46b.

The cross section 46a is formed in a circular cross section and lengthened in the leftward and right ward direction so as to extend between upper and lower middle portions of the left and right center side sections 43a of the center upper roll bar 43. A middle portion in the vehicle width direction of the cross section 46a is of downwardly projecting curved shape.

In the middle in the vehicle width direction of a left portion in the vehicle width direction of the cross section 46a there is provided in an upwardly projecting fashion a first bracket 61a which supports a headrest (see FIG. 1) for a driver Dr. In the middle in the vehicle width direction of a right portion in the vehicle width direction of the cross section 46a there is provided in an upwardly projecting fashion a second bracket 61b which supports a headrest (see FIG. 1) for a second passenger Fp2.

A pair of left and right gussets 46c is fixedly attached in such a way as to extend between outward sides in the vehicle width direction of the cross section 46a and the middle portions in the upward and downward direction of the left and right center side sections 43a of the center upper roll bar 43.

The left and right connecting sections 46b are configured to project downwardly from the middle portion in the vehicle width direction of the cross section 46a towards the cross section 29a of the seat back frame 29. The left and right connecting sections 46b of the center cross roll bar 46 and the left and right connecting sections 29d of the seat back frame 29 are joined to each other, so that the cross section 46a of the center cross roll bar 46 and the middle portion in the vehicle width direction of the cross section 29a of the seat back frame 29 are connected.

The left and right rear side roll bars 47 are arranged in left and right portions in the vehicle width direction of a rear space RR. The left and right rear side roll bars 47 include a pair of left and right upper sections 47a, a pair of left and right rear sections 47b, a pair of left and right lower sections 47c, and a pair of left and right rear end sections 47d.

The left and right upper sections 47a are connected to the left and right center side sections 43a of the center upper roll bar 43 by means of bolts and the like, and extend rectilinearly in the forward and rearward direction of the vehicle in a top plan view.

A pair of left and right gussets 47e is fixedly attached in such a way as to extend between front end portions of the left and right upper sections 47a and the left and right center side sections 43a of the center upper roll bar 43.

The left and right rear sections 47b are connected to rear ends of the left and right upper sections 47a and moderately inclined in a side view in such a way as to be located forwardly in the forward and rearward direction of the vehicle with approach toward the lower sides thereof.

The left and right lower sections 47c are connected to lower ends of the left and right rear sections 47b and extend inwardly in the vehicle width direction.

The left and right rear end sections 47d are connected to middle portions in the vehicle width direction of the left and right lower sections 47c and inclined in a top plan view in such a way as to be located inwardly in the vehicle width direction with approach toward the forward sides thereof.

The rear cross roll bar 48 is formed in a circular cross section and lengthened in the leftward and rightward direction so as to extend between bent portions (connecting portions between the left and right upper sections 47a and the left and right rear sections 47b) of the left and right rear side roll bars 47. A pair of left and right gussets 48a is fixedly attached in such a way as to extend between outer end portions in the vehicle width direction of the rear cross roll bar 48 and the bent portions of the left and right rear side roll bars 47.

Referring to FIGS. 1 and 4 through 6 at the same time, the seat 5 includes a seat cushion 6 and a seat back (not shown).

The seat cushion 6 has a plurality of (three in this embodiment, for example) seat bodies (a first seat body 6a, a second seat body 6b and a third seat body 6c) arranged side by side in the vehicle width direction. The first seat body 6a is the one for the driver Dr (see FIG. 1) and is located on the left side in the vehicle width direction. The second seat body 6b is the one for the first passenger Fp1 (see FIG. 1) and is located in the middle in the vehicle width direction. The third seat body 6c is the one for the second passenger Fp2 (see FIG. 1) and is located on the right side in the vehicle width direction.

Figure 6:
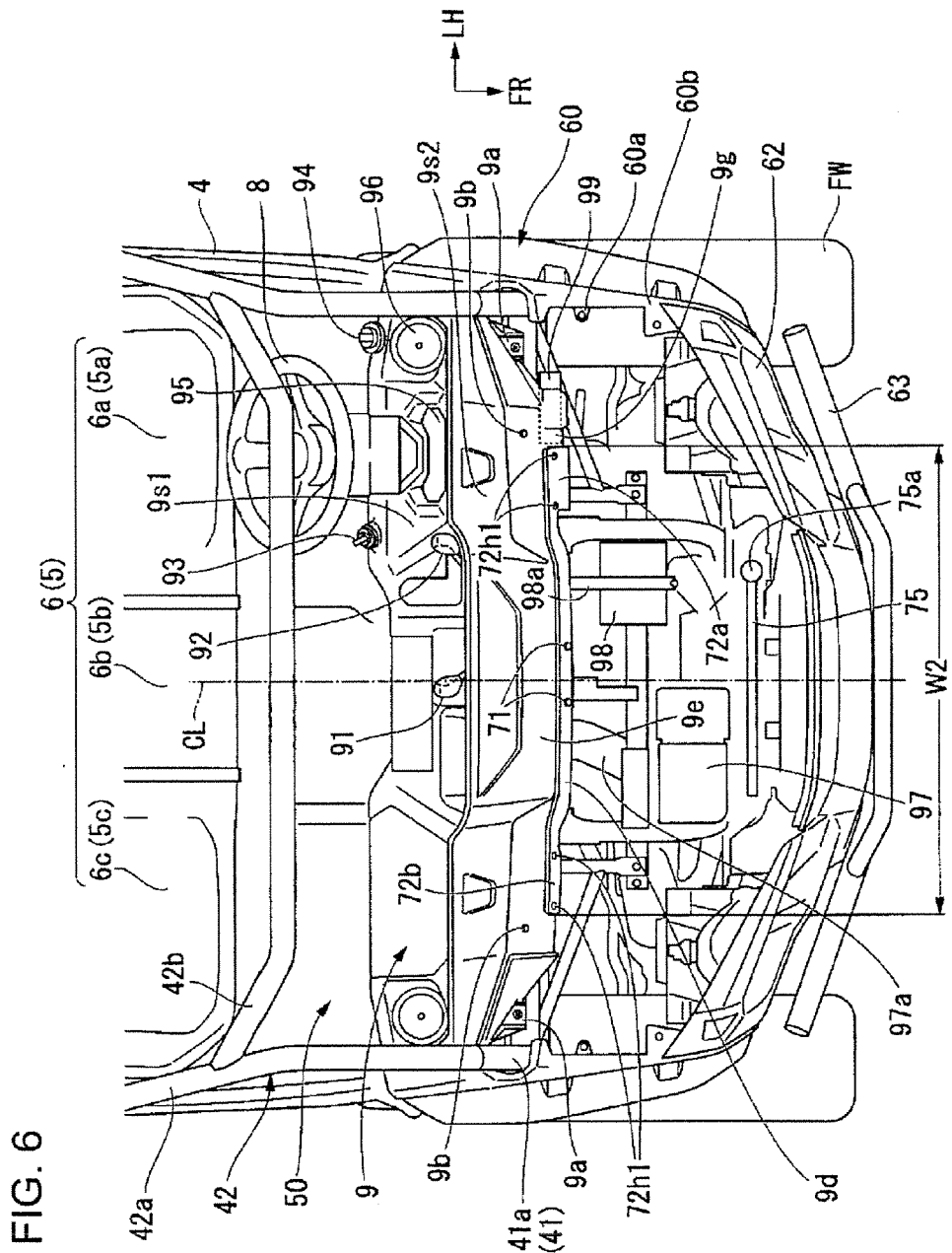
FIG. 6 is a top plan view of the peripheral structure of the front hood of the above vehicle with the front hood and a front fender removed.

In FIG. 6, a reference character 97a designates an intake pipe for introducing air into a combustion chamber of an internal combustion engine. A reference character 75 designates a radiator for cooling a coolant circulating in a water jacket of the internal combustion engine.

The seat cushion 6 is supported and fixed on the seat cushion frame 28 (see FIG. 3) constituting the vehicle body frame 20.

The seat back (not shown) is supported and fixed on the cross section 29a, the support section 29b and the pair of left and right connecting sections 29c of the seat back frame 29 (see FIG. 3).

Figure 4:
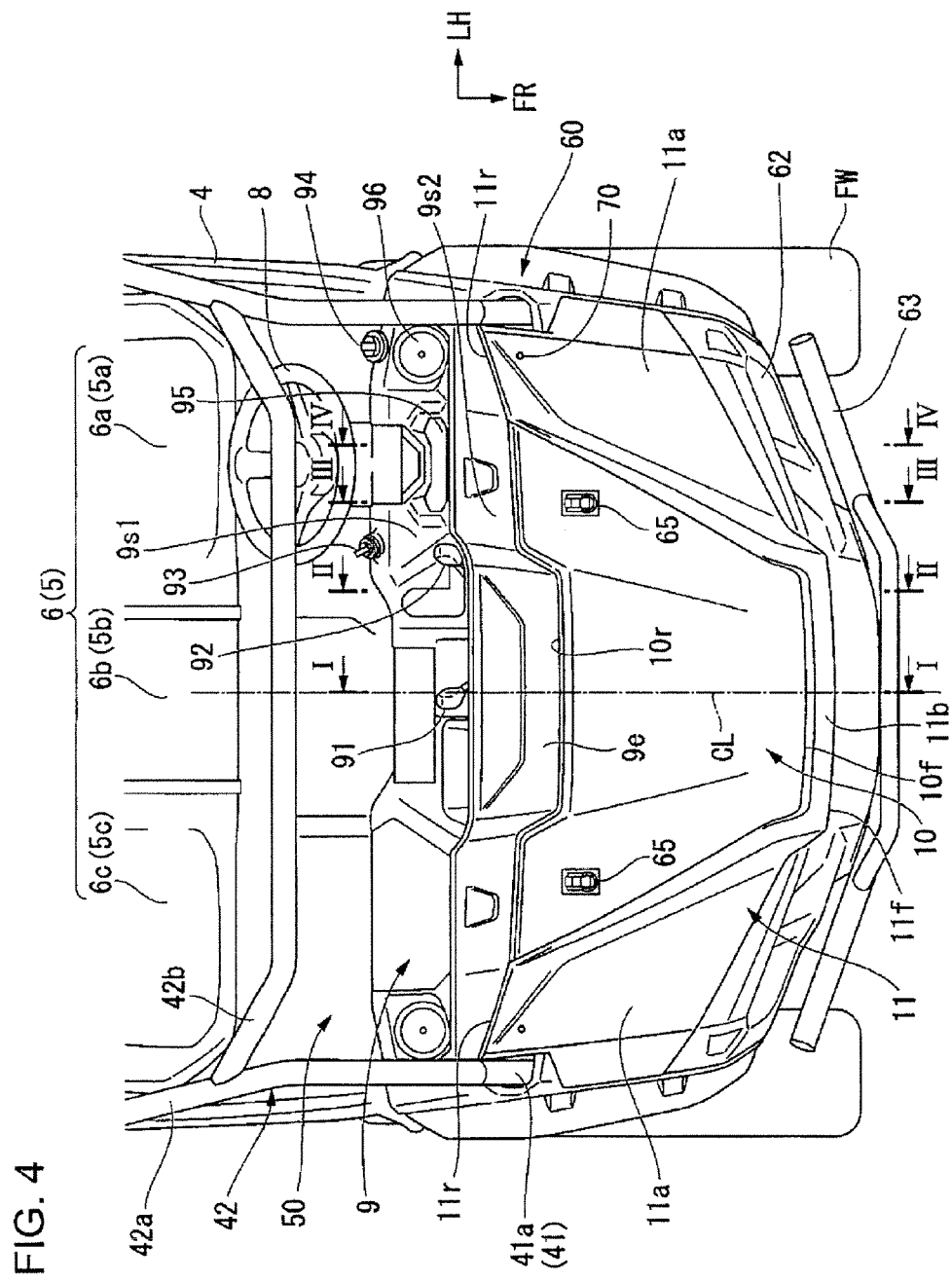
FIG. 4 is a top plan view of a peripheral structure of a front hood of the above vehicle.
Figure 5:
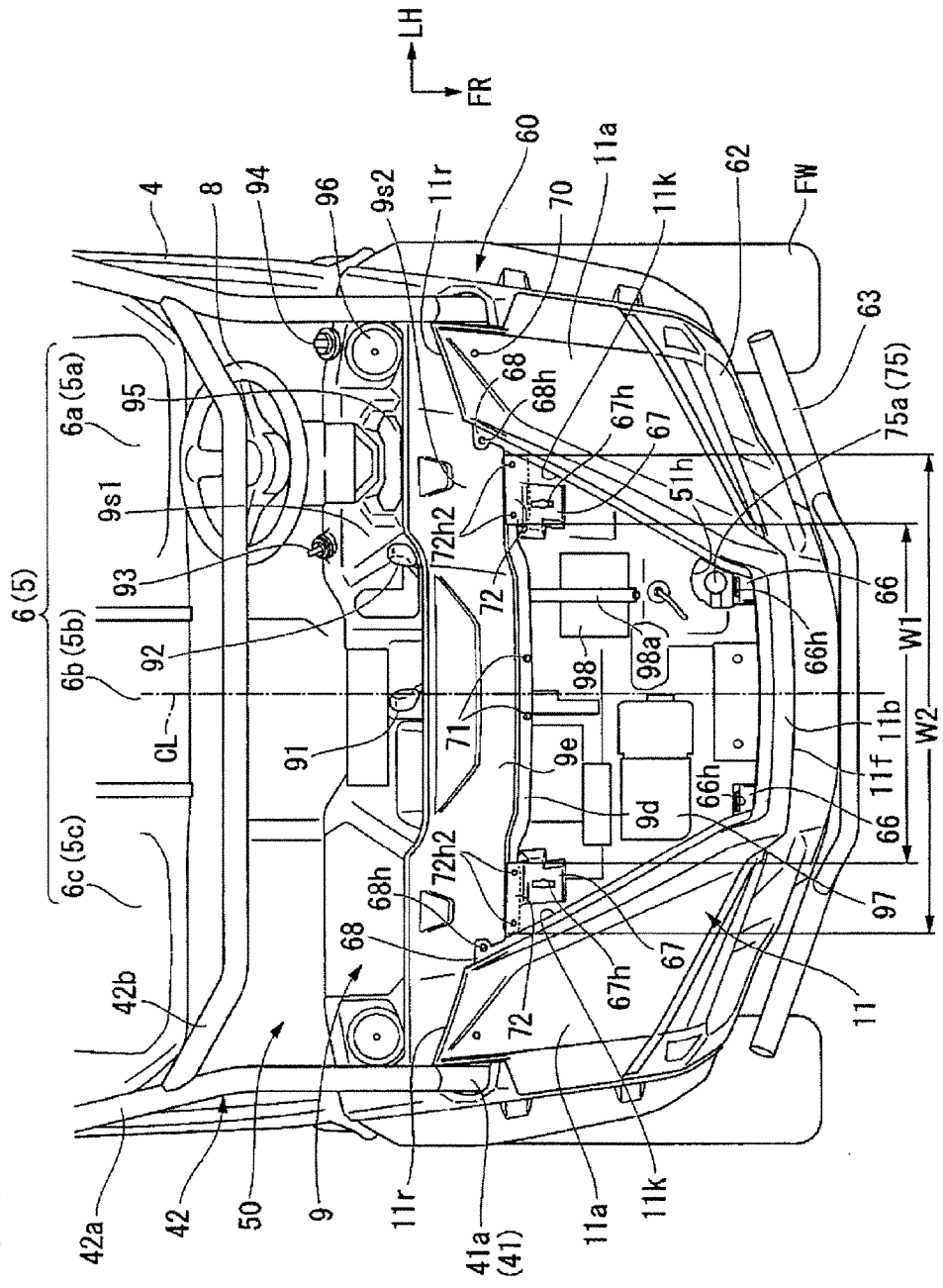
FIG. 5 is a top plan view of the peripheral structure of the front hood of the above vehicle with the front hood removed.

Referring to FIGS. 4 through 6, a front floor 50 (hereinafter, referred simply to as a "floor 50") extends in the vehicle width direction such that the occupants Dr, Fp1, Fp2 (the driver DR, the first passenger Fp1 and the second passenger Fp2 shown in FIG. 1) sitting side by side in the vehicle width direction are able to place their feet thereon, respectively. The floor 50 is formed with a flat surface portion.

Front and rear ends of the floor 5 in the forward and rearward direction of the vehicle and left and right ends in the vehicle width direction of the floor are supported by the body 2, respectively (see FIG. 1).

Figure 7:
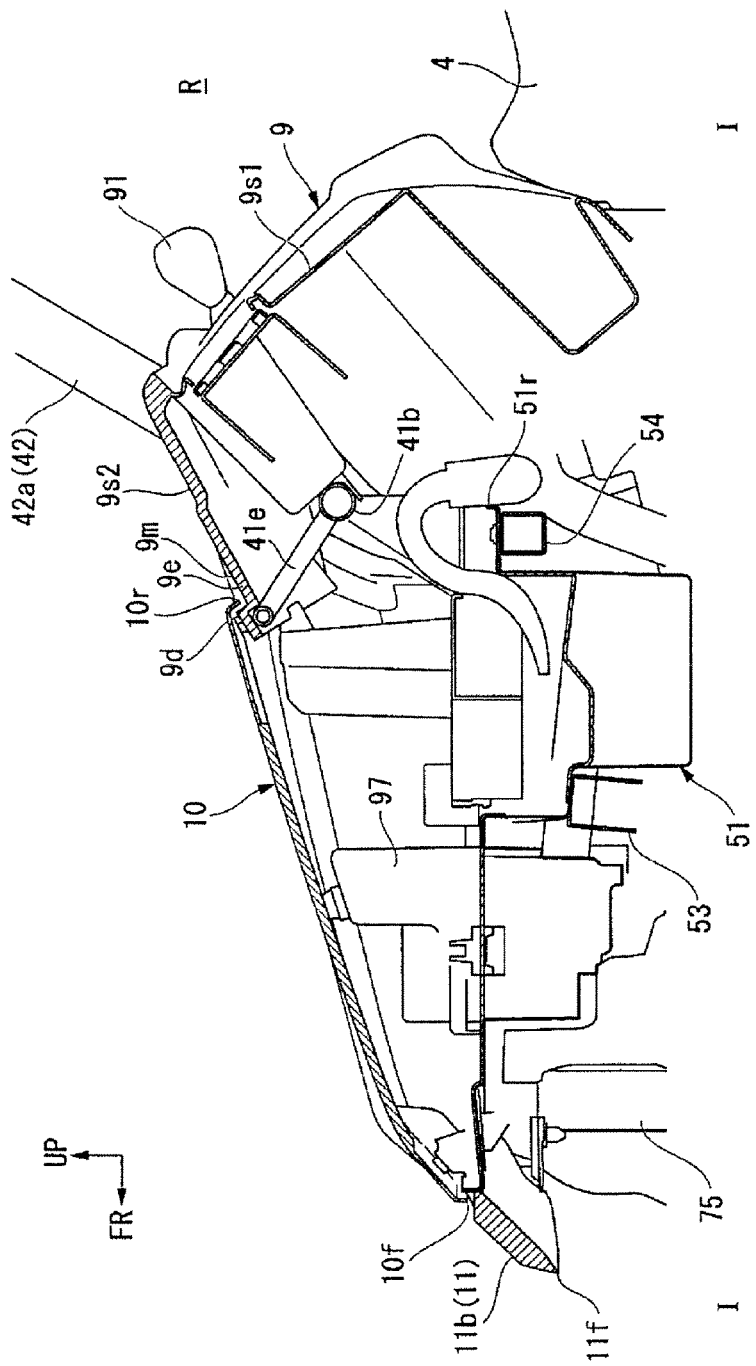
FIG. 7 is a cross sectional view taken along line I-I of FIG. 4.

Referring to FIGS. 4 and 7, the instrument panel 9 is arranged in the front part of the riding space R. The instrument panel 9 includes a first surface 9s1 facing the riding space R, and a second surface 9s2 which extends from an upper end of the first surface 0s1 diagonally forwardly and downwardly.

The front hood 10 extends forwardly of the second surface 9s2 of the instrument panel 9 and covers from above a storage compartment 51 which is arranged between the pair of left and right front wheels FW in front of the riding space R. The front hood 10 is configured to be freely openable and closable or detachable.

The instrument panel 9 has an extension section 9e which is located along the second surface 9s2 and extends diagonally forwardly and downwardly under a rear end of the front hood 10. At a front end portion of the extension section 9e there is provided a step section 9d which projects more upwardly than an upper surface 9m located to the rear of the front end portion.

The first surface 9s1, as shown in FIG. 7, extends from a front upper end thereof in the diagonally rearward and downward direction, and thereafter, is bent diagonally forwardly and downwardly, and then it is bent in an S-shape.

The second surface 9s2, as shown in FIG. 7, extends from a rear upper end thereof in the diagonally forward and downward direction, and thereafter, is bent forwardly to thereby extend diagonally forwardly and downwardly up to the extension section 9e, and then, it reaches the step section 9d at the front lower end portion of the extension section 9e.

The front hood 10, as shown in FIG. 7, extends for a rear upper end 10r thereof in the diagonally forward and downward direction, and thereafter, is bent more sharply than a rear portion thereof to extend in the diagonally forward and downward direction to thereby reach a front end 10f.

Referring to FIG. 4, on the side of the first surface 9s1 of the instrument panel 9, there are provided a first operating element 91, a second operating element 92, a key cylinder 93, a switch 94, a meter panel 95, a holder 96 and the like. The first operating element 91 is arranged in the middle in the vehicle width direction of a front upper part of the first surface 9s1 of the instrument panel 9. The first operating element 91 is a switching lever for switching a drive mode, for example.

The second operating element 92 is arranged on the left lateral side of the first operating element 91. The second operating element 92 is a switching lever, namely a shift lever for switching a traveling mode containing a parking mode, for example.

The key cylinder 93 is arranged on the right lateral side of the steering wheel 8.

The switch 94 is arranged on the left lateral side of the steering wheel 8 and located in a left end portion of the first surface 9s1 of the instrument panel 9. The switch 94 is a changeover switch for switching a high beam and a low beam of the head lamp 62, for example.

The meter panel 95 is arranged on the front upper side of the steering wheel 8.

The holders 96 are arranged in each of end portions in the vehicle width direction of the first surface 9s1 of the instrument panel 9.

The front fender 11 includes a pair of left and right fender sections 11a located adjacent to each of left and right forward ends of the front hood 10, a front section 11b and the storage compartment 51.

The left and right fender sections 11a are arranged in the vicinity of the left and right ends of the front hood 10 and configured to cover the pair of left and right front wheels FW from above. The storage compartment 51 is configured to connect integrally and continuously the pair of left and right fender sections 11a. Rear ends 11r of the left and right fender sections 11a are arranged continuously and side by side with the rear end 10r of the front hood 10 in the vehicle width direction. The rear ends 11r of the left and right fender sections 11a are inclined in such a condition as to be located rearwardly with approach toward the outward sides in the vehicle width direction thereof in a top plan view. The rear end 10r of the front hood 10 is of U-shape which is concaved forwardly in the middle and its environs in the vehicle width direction in a top plan view The front section 11b extends left and right in the vehicle width direction so as to provide a connection between front end portions of the left and right fender sections 11a. Referring to FIG. 7 together, an upper rear end of the fender section 11b is located at the rear of and under a front end 10f of the front hood 10.

Referring to FIGS. 5 and 6, the front end portion of the extension section 9e of the instrument panel 9 is arranged under the rear ends 11r of the left and right fender sections 11a and under the rear end 10r of the front hood 10. The step section 9d of the instrument panel 9 extends continuously in the vehicle width direction. Both ends in the vehicle width direction of the step section (9d) are covered with the pair of left and right fender sections 11a in a top plan view.

Referring to FIG. 7, a rear end 51r in the vicinity of the middle in the vehicle width direction of the storage compartment 51 is located under the second surface 9s2 of the instrument panel 9. Both end portions in the vehicle width direction of a part of the storage compartment 51 which overlaps with the step section 9d in a top plan view are located inwardly from both ends in the vehicle width direction of the step section 9d. In other words, the length W1 (see FIG. 5) in the vehicle width direction of the part of the storage compartment 51 which overlaps with the step section 9d in a top plan view is shorter than the length W2 (see FIG. 6) in the vehicle width direction of the step section 9d (W1<W2).

Referring to FIG. 5, in the middle in the forward and rearward direction on the right side of the storage compartment 51 there is provided a lid member 97 of an intake port of the intake pipe 97a (see FIG. 6). In a left rear part of the storage compartment 51 there is provided a battery 98. The battery 98 is supported and fixed by fastening front and rear ends of a clamp portion 98a to clamp mounting holes (not shown) with bolts in a state of being accommodated in the storage compartment 51. In a front end part on the left side of the storage compartment 51 there is formed an opening 51h which allows a cap 75a of the radiator 75 to be exposed in a top plan view.

Figure 10:
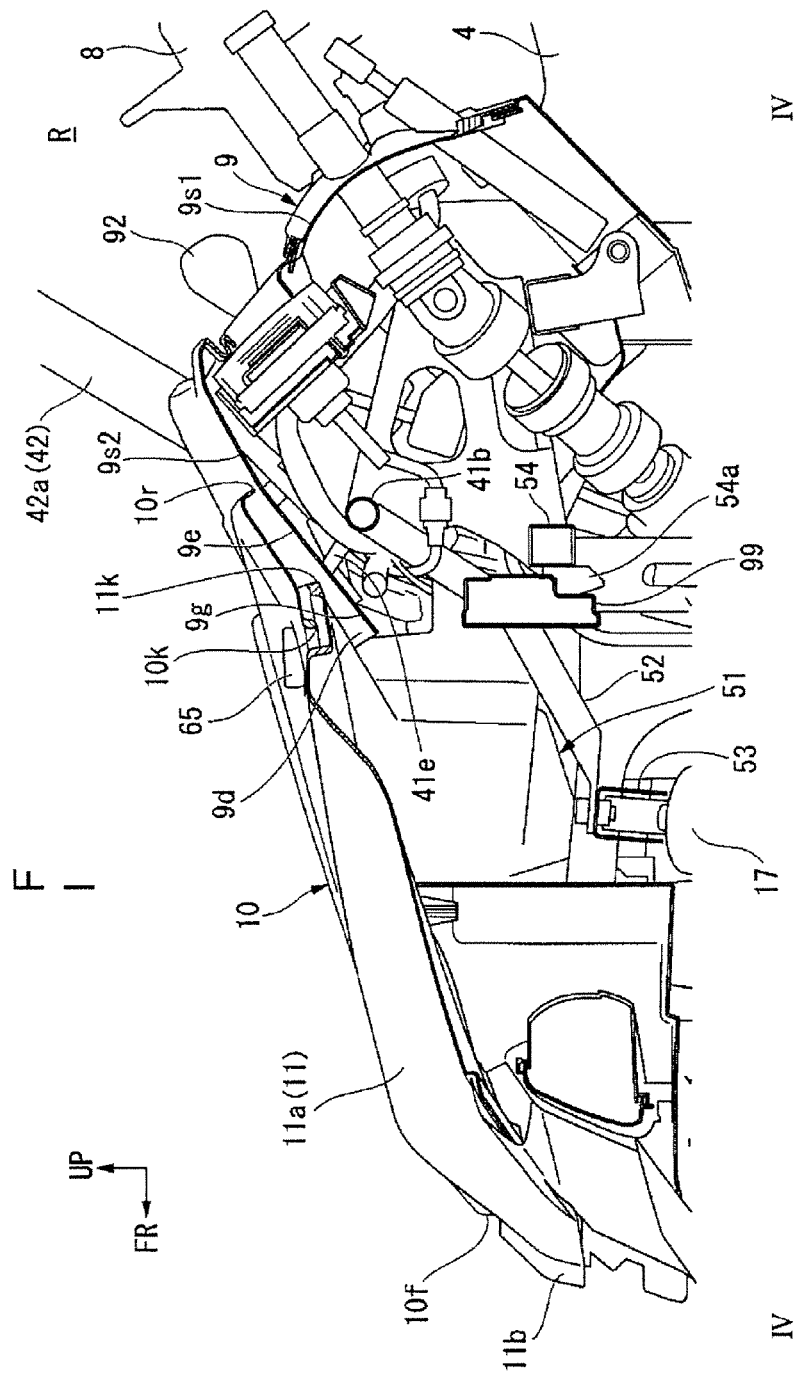
FIG. 10 is a cross sectional view taken along line IV-IV of FIG. 4.
Figure 11:
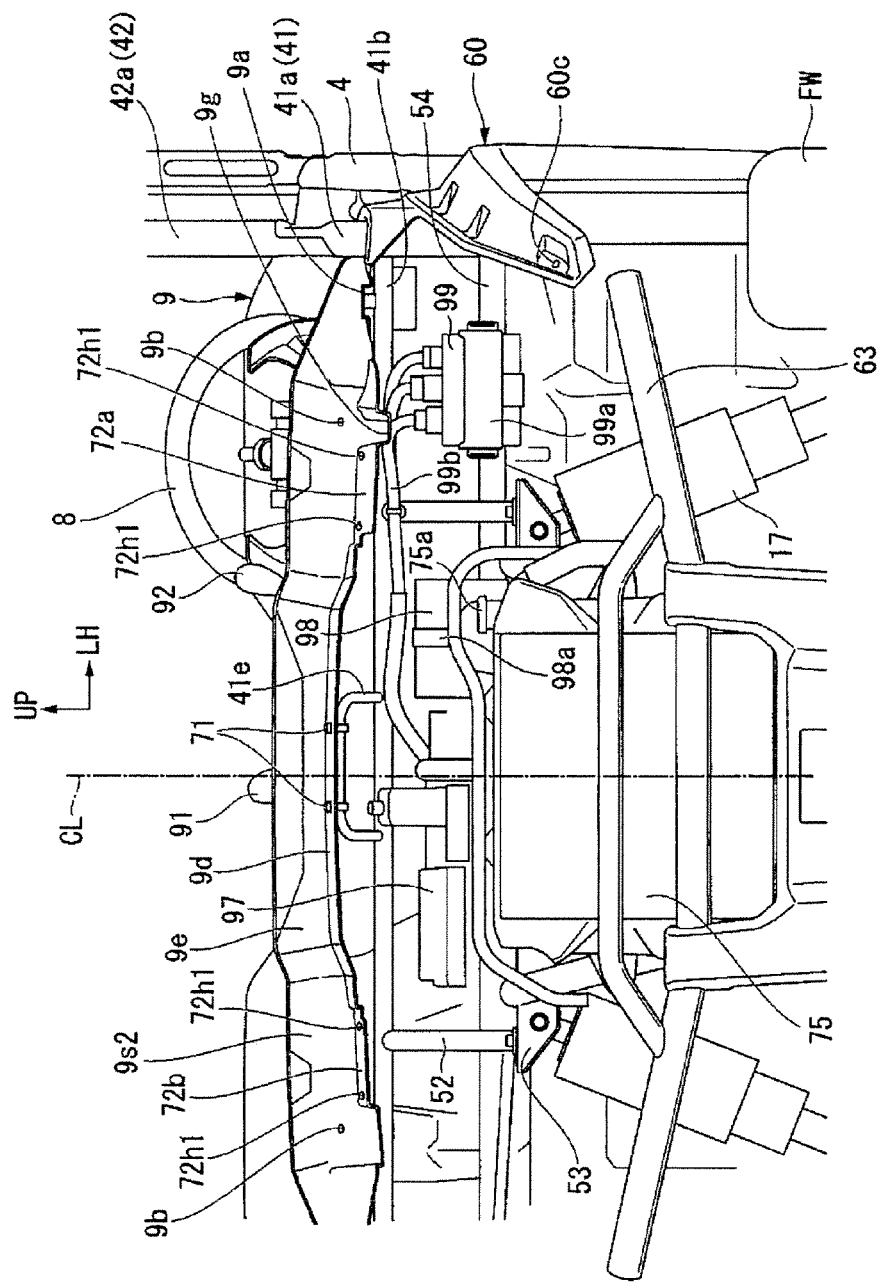
FIG. 11 is a front view of the peripheral structure of the front hood of the above vehicle with the front hood and the front fender removed.

Referring to FIGS. 6, 10 and 11, electrical equipment 99 is provided below a rear part of the left fender section 11a. The electrical equipment 99 is an engine control unit (ECU), for example. The extension section 9e of the instrument panel 9 extends above and forwardly of the electrical equipment 99 on the lower side of the left fender section 1a.

A guide section 9g is formed at the front end portion of the extension section 9e of the instrument panel 9 and on the left side of a left end portion of the step section 9d thereof. The guide section 9g is configured to guide the rainwater or the like which is dammed up by the step section 9d, in such a way as to flow externally of the storage compartment 51. An upper surface of the guide section 9g extends flush with and continuous with an upper surface of the extension section 9e. A front lower end of the guide section 9g is situated forwardly of a front end of the electrical equipment 99.

Referring to FIG. 11, the second surface 9s2 of the instrument panel 9 has a convexed shape formed in such a condition as to allow the middle in the vehicle width direction to project more diagonally forwardly and upwardly than both ends in the vehicle width direction. The height in the upward and downward direction of the second surface 9s2 of the instrument panel 9 is highest in the middle in the vehicle width direction and is lowered gradually with approach toward the outward sides in the vehicle width direction.

Referring to FIGS. 4 and 7, the front hood 10 extends diagonally forwardly and downwardly from the upper rear end 10r to the lower front end 10f in a continuous fashion.

Referring to FIGS. 4 and 10, the front fender 11 extends diagonally forwardly and downwardly from the upper rear end 11r to the lower front end 11f in a continuous fashion.

Referring to FIGS. 5 and 10, outward ends 10k in the vehicle width direction of the front hood 10 extend downwardly. Inward ends 11k in the vehicle width direction of the left and right fender sections 11a extend upwardly. The inward ends 11k in the vehicle width direction of the left and right fender sections 11a are located above the extension section 9e of the instrument panel 9 and rearwardly of the outward ends 10k in the vehicle width direction of the front hood 10. The outward ends 10k in the vehicle width direction of the front hood 10, the inward ends 11k in the vehicle width direction of the left and right fender sections 11a, and the extension section 9e of the instrument panel 9 are configured to form a labyrinth structure.

The outward ends 10k in the vehicle width direction of the front hood 10 and the inward ends 11k in the vehicle width direction of the left and right fender sections 11a are formed in such a condition as to be reduced in space in the vehicle width direction with approach toward the forward side thereof, respectively.

Referring to FIGS. 7 and 11, a support member 41e of circular cross section is provided in the middle in the vehicle width direction of the upper cross section 41 b of the front top roll bar 41. The support member 41e is formed in a U-shape in a front view which projects diagonally forwardly and upwardly from the middle in the vehicle width direction of the upper cross section 41b. The support member 41e is configured to support a rear lower surface of the step section 9d of the instrument panel 9. The step section 9d of the instrument panel 9 is supported on the support member 41e by a pair of left and right clamps 71.

Figure 9:
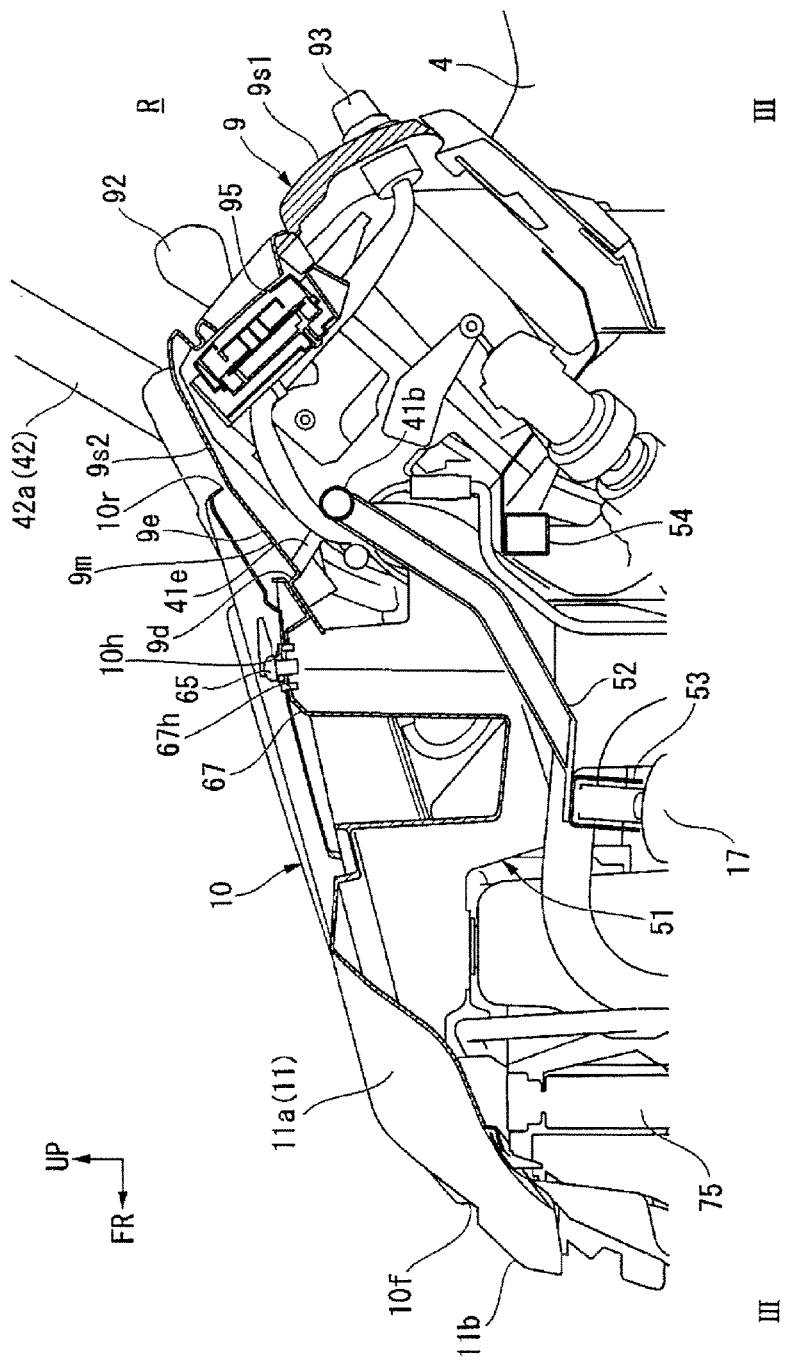
FIG. 9 is a cross sectional view taken along line III-III of FIG. 4.

Referring to FIGS. 9 and 11, a pair of left and right connecting members 52 is provided in the upper cross section 41 of the front top roll bar 41. As shown in FIG. 9, the left and right connecting members 52 extend diagonally forwardly and downwardly from the upper cross section 41b as a starting point. Then, those are bent in a state of being inclined more moderately than the rear sides and extend diagonally forwardly and downwardly. A support member 53 is provided in front lower ends of the left and right connecting members 52. The support member 53 is formed in a U-shaped cross section and extends in the vehicle width direction. The support member 53 supports an upper end portion of the front suspension 17 at both ends in the vehicle width direction thereof. Referring to FIG. 7, the support member 53 supports a middle lower part in the forward and rearward direction of the storage compartment 51 in the middle in the vehicle width direction.

A cross frame 54 is provided on the upper rear side of the support member 53 and under the upper cross section 41b. The cross frame 54 is formed in a rectangular cross section and extends in the vehicle width direction. The electrical equipment 99 is mounted on a left end portion in the vehicle width direction of the cross frame 54 through a clamp 99a. A harness 99b is arranged on an upper end portion of the electrical equipment 99. The harness 99b extends inwardly in the vehicle width direction from the upper end portion of the electrical equipment 99. Referring to FIG. 7, the cross frame 54 supports a lower rear end portion of the storage compartment 51 at the middle portion in the vehicle width direction thereof.

Referring to FIGS. 6 and 11, a pair of mounting portions 72a, 72b is formed in each end in the vehicle width direction of the step section 9d of the instrument panel 9. A front lower end of the left mounting portion 72a extends forwardly of a front lower end of the right mounting portion 72b. In the left and right mounting portions 72a, 72b, a pair of left and right through holes 72h1 which opens in the upward and downward direction is formed side by side in the leftward and rightward direction.

A pair of left and right mounting portions 9a is formed at each end in the vehicle width direction of the extension section 9e of the instrument panel 9. A pair of left and right through holes 9b which opens in the upward and downward direction is formed between each of the left and right mounting portions 9a and each of the left and right mounting portions 72a, 72b of the instrument panel 9.

Referring to FIG. 5, a pair of left and right mounting portions 68 projecting inwardly in the vehicle width direction is formed in a rear end part of an inner end 11k in the vehicle width direction of each of the left and right fender sections 11a of the front fender 11. In the left and right mounting portions 68 there are formed through holes 68h each of which opens in the upward and downward direction.

A pair of left and right mounting portions 72 is formed in left and right rear end portions of the storage compartment 51 of the front fender 11. In the left and right mounting portions 72 there are formed upwardly and downwardly open through holes 72h2 which are arranged side by side in the leftward and rightward direction.

When the front fender 11 is mounted on the instrument panel 9, the rear end portions of the left and right fender sections 11a of the front fender 11 come into contact with the both ends in the vehicle width direction of the extension section 9e of the instrument panel 9, and at the same time, the left and right mounting portions 72 of the storage compartment 51 of the front fender 11 come into contact with the left and right mounting portions 72a, 72b of the step section 9d of the instrument panel 9, so that the left and right through holes 72h2 of the front fender 11 are positioned with respect to the left and right through holes 72h1 of the instrument panel 9. Then, trim clips or the like are inserted into and pass through the left and right through holes 72h2 of the front fender 11 and the left and right through holes 72h1 of the instrument panel 9, and bolts are inserted into the through holes 68h of the front fender 11 and screwed up against the left and right mounting portions 9a of the instrument panel 9, so that the front fender 11 is fastened to and mounted on the instrument panel 9.

Figure 8:
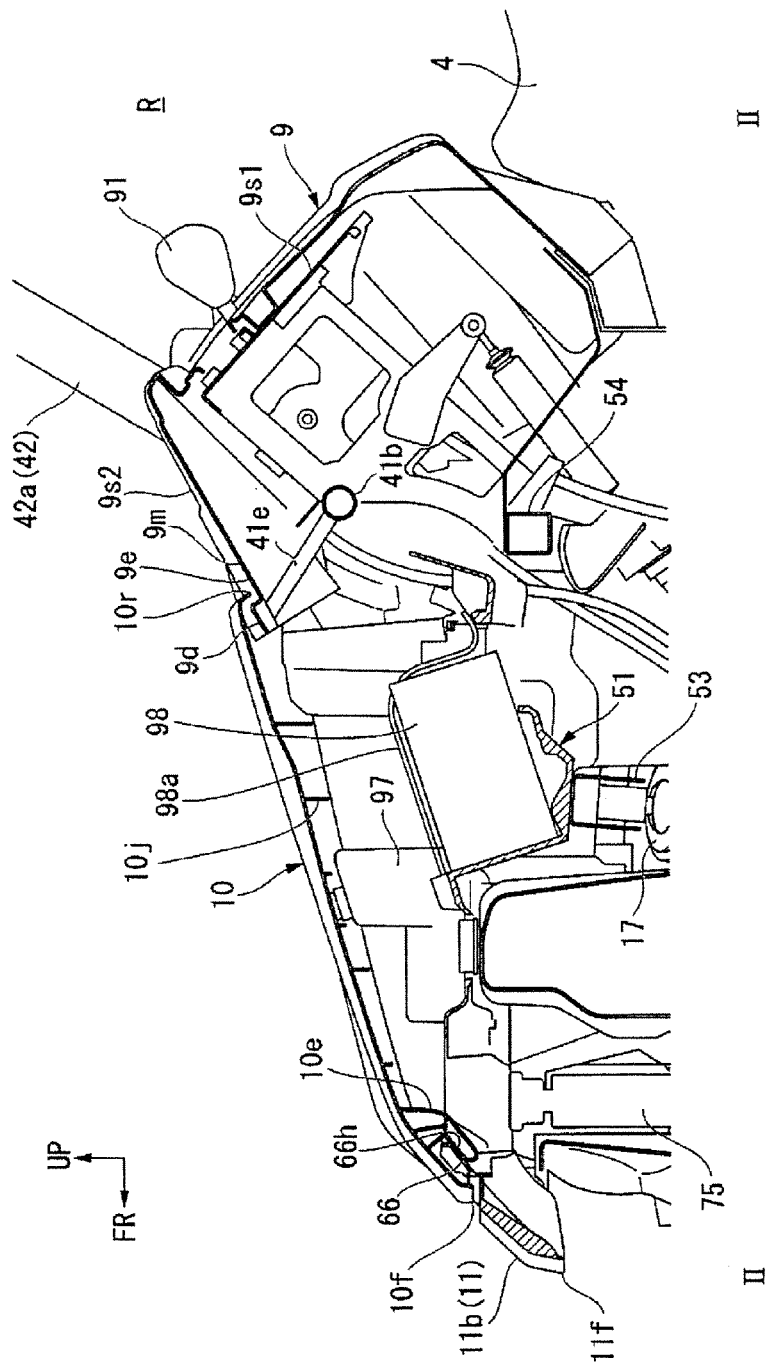
FIG. 8 is a cross sectional view taken along line II-II of FIG. 4.

Referring to FIGS. 5 and 8, in the lower surface of the front hood 10, a plurality (six in this embodiment, for example) of ribs 10j is formed at predetermined spaced intervals in the forward and rearward direction of the vehicle. Each of the ribs 10j extends downwardly from the lower surface of the front hood 10.

A pair of right and left claw portions 10e is provided in a front lower part of the front hood 10. The left and right claw portions 10e are formed in an L-shape which extends downwardly from the front lower surface of the front hood 10 and thereafter is bent diagonally forwardly and downwardly.

A pair of left and right insertion portions 66 into which each of the left and right claw portions 10e of the front hood 10 is inserted is formed in left and right front end portions of the storage compartment 51. In the left and right insertion portions 66, there are formed inserting holes 66h each of which opens diagonally rearwardly and downwardly.

Referring to FIGS. 5 and 9, a pair of left and right through holes 10h into which each of buckles 65 is inserted is formed in left and right rear end portions of the front hood 10. A pair of left and right mounting portions 67 on which each of the buckles 65 is mounted is formed in left and right rear end portions of the storage compartment 51. In the left and right mounting portions 67 there are formed through holes 67h each of which opens in the upward and downward direction.

Referring to FIGS. 8 and 9, when mounting the front hood 10 on the front fender 11, first, the left and right claw portions 10e of the front hood 10 are inserted into the inserting holes 66h of the left and right insertion portions 66 of the storage compartment 51. Thereafter, the front hood 10 comes into contact with the left and right mounting portions 67 of the storage compartment 51 and the left and right through holes 10h of the front hood 10 are positioned with respect to the left and right through holes 67h of the storage compartment 51. Then, the buckles 65 pass through the left and right through holes 10h of the front hood 10 and the left and right through holes 67h of the storage compartment 51 and are rotated to a predetermined angle, so that the front hood 10 is mounted on the front fender 11.

The pair of left and right claw portions 10e is provided in the front lower part of the front hood 10 and engaged with the left and right insertion portions 66 of the storage compartment 51. The front hood 10 is mounted together with the buckles 65 on the front fender 11. With this construction, the number of component parts and a man-hour for assembling can be reduced in comparison with the case of being assembled by provision of hinges. In addition, since the front hood 10 is made of resin and reduced in weight, the assembling can be performed easily whether the front hood 10 is of the opening and closing type or the detachable type.

Referring to FIG. 6, in areas of front upper end portions of the left and right front mudguards 60 which are adjacent to the left and right fender sections 11a, mounting portions 60a and 60b which project inwardly in the vehicle width direction are formed at predetermined spaced intervals in the forward and rearward direction. When bolts are inserted into through holes of the mounting portions 60a, 60b of the left and right mudguards 60 and screwed up against fastening portions (not shown) of outward lower portions in the vehicle width direction of the left and right fender sections 11a of the front fender 11, the front upper end portions of the left and right front mudguards 60 are fastened and fixed against the left and right fender sections 11a of the front fender 11.

Figure 12:
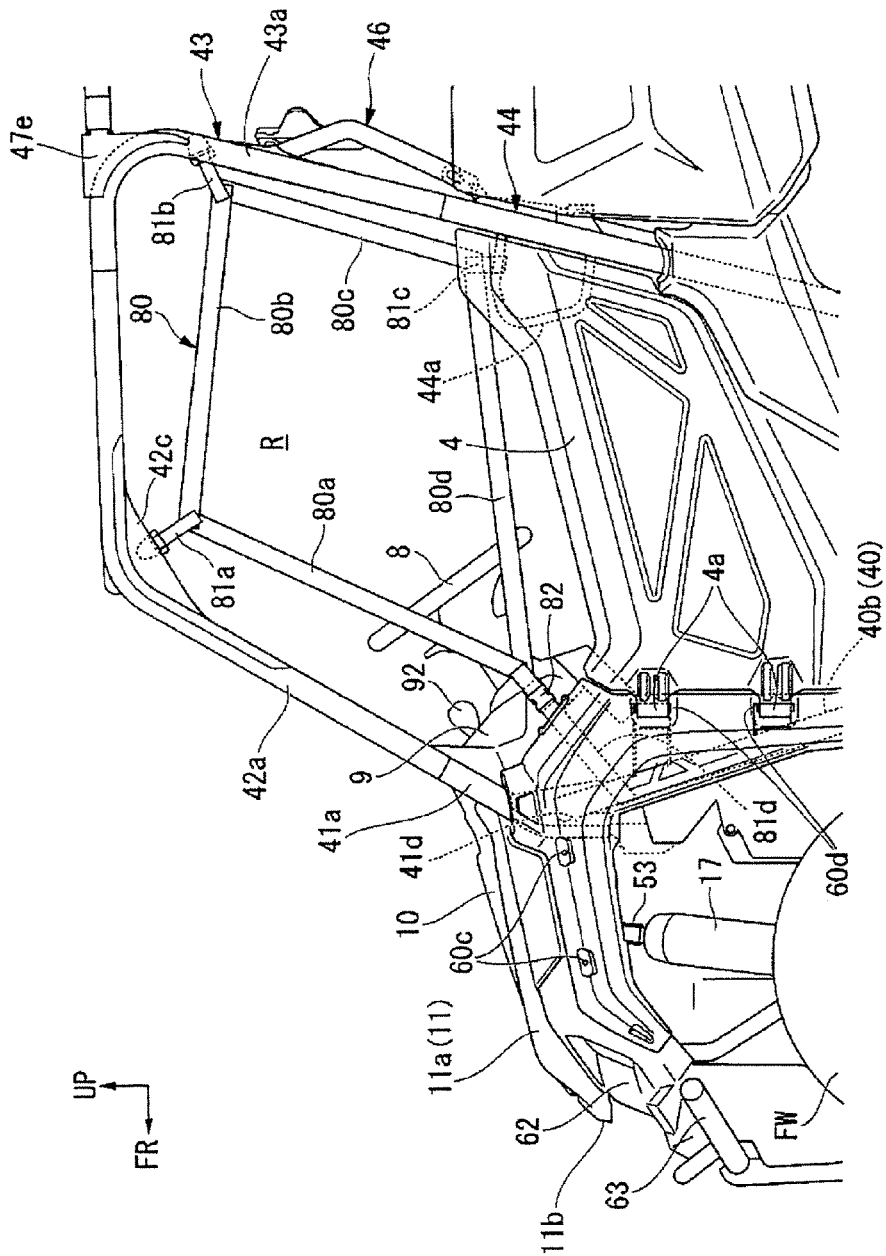
FIG. 12 is a left side view of a side net mounting structure of the above vehicle.

Referring to FIGS. 11 and 12, in each of the front upper end portions of the left and right front mudguards 60, a plurality (three in this embodiment, for example) of through holes 60c is formed at predetermined spaced intervals in the forward and rearward direction. The one in front, of the through holes 60c opens in such a condition as to be inclined slightly outwardly in the vehicle width direction with respect to the upward and downward direction of the vehicle. On the other hand, two through holes 60c in the rear open in the vehicle width direction. When bolts are inserted into forwardly located two through holes 60c and screwed up against fastening portions (not shown) of outer end portions in the vehicle width direction of the left and right head lamps 62, and another bold is inserted into one through hole 60c in the rear and screwed up against fastening portions (not shown) of outer end portions in the vehicle width direction of the left and right fender sections 11a of the front fender 11, the front end portions of the left and right mudguards 60 are fastened and fixed against the left and right fender sections 11a of the front fender 11 respectively, for example.

In a rear lower part of each of the left and right front mudguards 60, a plurality (two in this embodiment, for example) of mounting portions 60d of the door 4 is formed at predetermined spaced intervals in the upward and downward direction. In a front end part of each of the left and right doors 4, a plurality (two in this embodiment, for example) of engaging portions 4a is formed at spaced intervals in the upward and downward direction which correspond to the mounting portions 60d of the left and right front mudguards 60. When the engaging portions 4a of the left and right doors 4 are engaged with the mounting portions 60d of the left and right front mudguards 60, the left and right doors 4 are connected to the left and right front mudguards 60 in an openable and closable fashion.

Referring to FIG. 12, in a side view, a pair of left and right side nets 80 is arranged on either side in the vehicle width direction of the riding space R and in a space surrounded by the left and right top side sections 41a of the front top roll bar 41, the left and right upper side sections 42a of the front upper roll bar 42, the left and right center side sections 43a of the center upper roll bar 43, the upper ends of the left and right doors 4, and the rear upper ends of the left and right front mudguards 50.

The left and right side nets 80 are of rectangular shape in the side view. Each of the left and right side nets 80 includes a first belt 80a, a second belt 80b, a third belt 80c and a fourth belt 80d. The first belt 80a extends along each of the left and right upper side sections 42a of the front upper roll bar 42 in a side view.

The second belt 80b extends rectilinearly in the forward and rearward direction and is inclined in such a condition as to be located downwardly with approach toward the rear side thereof in a side view. A front end portion of the second belt 80b is connected to an upper end portion of the first belt 80a.

The third belt 80c extends rectilinearly along each lower portion of the left and right center side sections 43a of the center upper roll bar 43 in a side view, and an upper end portion thereof is connected to a rear end portion of the second belt 80b.

The fourth belt 80d extends rectilinearly in the forward and rearward direction in a side view. A front end portion of the fourth belt 80d is connected to a lower end portion of the first belt 80a, while a rear end portion thereof is connected to a lower end portion of the third belt 80c.

A first fixing belt 81a is connected at its one end portion to the connecting portion between the first belt 80a and the second belt 80b. The other end portion of the first fixing belt 81a is connected to each of the left and right gussets 42c through a fastener or the like.

A second fixing belt 81b is connected at its one end portion to the connecting portion between the second belt 80b and the third belt 80c. The other end portion of the second fixing belt 81b is connected to each upper portion of the left and right center side sections 43*a* in the vicinity of lower ends of the left and right gussets 47*e*.

One end portion of a third fixing belt 81*c* is connected to the connecting portion between the third belt 80*c* and fourth belt 80*d*. The other end portion of the third fixing belt 81*c* is joined through a fastener or the like to each upper portion of the left and right brackets 44*a* provided in the left and right center side roll bars 44, in a detachable fashion by the rider.

A fourth fixing belt 81*d* is connected at its one end portion to the connecting portion between the fourth belt 80*d* and the first belt 80*a*. The other end portion of the fourth fixing belt 81*d* is connected to each of the left and right front sections 40*b* of the left and right side roll bars 40 through a buckle 82.

Figure 13:
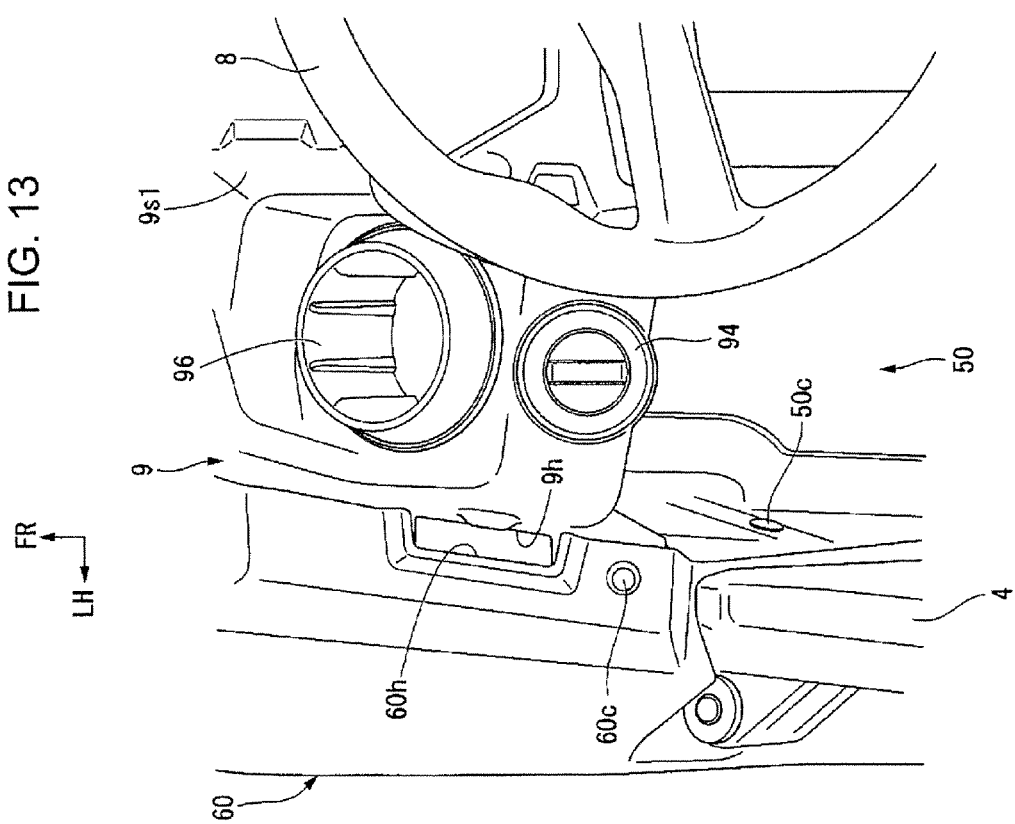
FIG. 13 is a perspective view, as seen from the upper rear side, of a connecting portion between the instrument panel and a front mad guard.

Referring to FIG. 13, a U-shaped opening portion 60*h* which opens inwardly in the vehicle width direction is formed in each of the rear upper end portions of the left and right front mudguards 60 and in a position opposed to each of the outer end portions in the vehicle width direction of the instrument panel 9. On the other hand, a U-shaped opening 9*h* which communicates with each of the opening portions 60*h* of the left and right mudguards 60 under each of the opening portions 60*h* and opens outwardly in the vehicle width direction is formed in a position opposed to each of the rear upper end portions of the left and right front mudguards 60.

Each of the opening portion 60*h* and opening portion 9*h* has a size as the fourth fixing belt 81*d* can pass through it and as the buckle 82 cannot pass through it. With this construction, a portion located on the other end portion side of the fourth fixing belt 81*d* is concealed inwardly in the vehicle width direction from each of the left and right front mudguards 60, so as to be prevented from the irradiation of ultraviolet rays and the contact with an obstacle whereby to improve the durability. On the other hand, since the buckle 82 stops at the opening portion 60*h* of each of the left and right mudguards 60, the position of the buckle 82 can be fixed.

Further, in FIG. 13, a reference character 50*c* designates a trim clip for fixing each of lateral wall portions in the vehicle width direction of the floor 50 on the left and right front mudguards 60. A reference character 60*c* designates a trim clip for fixing left and right rear end portions in the vehicle width direction of the instrument panel 9 on the left and right front mudguards 60.

As explained above, in this embodiment, the peripheral structure of the front hood of a vehicle 1 comprises an instrument panel 9 being arranged in the front part of the riding space R and including the first surface 9*s*1 facing the riding space R and the second surface 9*s*2 extending diagonally forwardly and downwardly from the upper end of the first surface 9*s*1, and an openable and closable or detachable front hood 10 extending forwardly of the second surface 9*s*2 and covering from above the storage compartment 51 which is arranged in front of the riding space R and between the pair of left and right front wheels FW, wherein the instrument panel 9 has the extension section 9*e* which is located along the second surface 9*s*2 and which extends diagonally forwardly and downwardly under the rear end 10*r* of the front hood 10, and the step section 9*d* is provided at the front end portion of the extension section 9*e* and projects more upwardly than the upper surface 9*m* which is located in the rear of the front end portion.

With this construction, even if the rainwater flows into the joint between the instrument panel 9 and the front hood 10. the rainwater having flown into the joint flows forwardly and downwardly along the extension section 9*e* of the second surface 9*s*2 and is dammed up by the step section 9*d* in the end. Therefore, it is possible to prevent the rainwater from flowing into the storage compartment 51 under the front hood 10.

Further, in the above embodiment, the front fender 11 includes the pair of left and right fender sections 11*a* located adjacent to the left and right lateral ends of the front hood 10 and configured to cover the pair of left and right front wheels FW from above. The storage compartment 51 connects integrally and continuously the pair of left and right fender sections 11*a*. The rear ends 11*r* of the pair of left and right fender sections 11*a* of the front fender 11 are arranged continuously and side by side with the rear end 10*r* of the front hood 10 in the vehicle width direction. The front end portion of the extension section 9*e* of the instrument panel 9 is arranged under the rear ends 11*r* of the pair of left and fender sections 11*a* and the rear end 10*r* of the front hood 10. The step section 9*d* extends continuously in the vehicle width direction, and at least both ends in the vehicle width direction of the step section 9*d* are covered with the pair of left and right fender sections 11*a* in a top plan view. At least the rear end 51*r* of the storage compartment 51 around the middle in the vehicle width direction thereof is located under the second surface 9*s*2, and both end portions in the vehicle width direction of the storage compartment 51 located in a part of the storage compartment 51 which overlaps with the step section 9*d* in a top plan view are positioned inwardly from the both ends W2 in the vehicle width direction of the step section 9*d*. With this construction, even if the rainwater dammed up by the step section 9*d* flows downwardly from both the ends of the step section 9*d*, the rainwater flows out to the outside of the storage compartment 51. Therefore, it is possible to prevent the rainwater from flowing into the storage compartment 51.

Further, in the above embodiment, since the electrical equipment 99 is arranged in the rear lower position of at least one of the pair of left and right fender sections 11*a*, and the extension section 9*e* of the instrument panel 9 extends to the position in front of and above the electrical equipment 99 under the fender section 11*a*, the rainwater which flows forwardly and downwardly along the extension section 9*e* of the second surface 9*s*2 is guided forwardly of the electrical equipment 99 under the fender section 11*a*. Therefore, the rainwater can be prevented from falling and splashing on to the electrical equipment 99.

Further, in the above embodiment, since the second surface 9*s*2 of the instrument panel 9 is formed in a convex shape which projects diagonally forwardly and upwardly at the middle in the vehicle width direction as against both sides in the vehicle width direction, the rainwater is hardly collected in the middle in the vehicle width direction of the instrument panel 9. In particular, the rainwater is distributed to the left and to the right in the vehicle width direction by the traveling air. Therefore, an amount of the rainwater flowing into the joint between the instrument panel 9 and the front hood 10 can be decreased.

Further, in the above embodiment, since the front fender 11 is arranged adjacent to the left and right lateral ends of the front hood 10, and each of the front hood 10 and the front fender 11 extends continuously in the diagonally forward and downward direction from the rear end 10*r*, 11*r* to the front end 10*f*, 11*f* thereof, the rainwater falling on the front hood 10 and the front fender 11 flows forwardly. Therefore, the rainwater which flows into the joint between the instrument panel 9 and the front hood 10 is limited substantially to the rainwater falling on the instrument panel 9. Thus, the amount of the rainwater flowing into the joint between the instrument panel 9 and the front hood 10 can be decreased.

It is noted that, in the above embodiment, although the step section 9d is integrally formed in the front end portion of the extension section 9e of the instrument panel 9, as an example, it is not limited to this type. For example, a separate thick plate may be provided at the front end portion of the extension section 9e of the instrument panel 9 so as to form the step section. Namely, the step section 9e may be formed separately in the front end portion of the extension section 9e of the instrument panel 9.

Further, in the above embodiment, the number of the fastening portions and the mounting portions or the like and the arrangement positions with respect to the front hood 10, the front fender 11, the front mudguard 60, the body 2, etc. are given only as examples, and modifications may be made properly to suite the situation.

The present invention is not limited to the above embodiment. For example, without limitation to the four-wheeled vehicle as described above, certain embodiments may be applied to various vehicles such as two-wheeled vehicle, three-wheeled vehicle or the like.

In addition, the construction in the above embodiment is given as an example of the present invention, and various changes and modifications in such a way as to replace the component elements of the above embodiment with well known component elements for example, may be made without departing from the spirit and scope thereof.

DESCRIPTION OF REFERENCE CHARACTERS

1: Vehicle, 9: Instrument panel, 9d: Step section, 9e: Extension section, 9m: Upper surface located to the rear of front end portion of extension section, 9s1: First surface, 9s2: Second surface, 10: Front hood, 10f: Front end of front hood, 10r: Rear end of front hood, 11: Front fender, 11a: Fender section, 11f: Front end of front fender, 11r: Rear end of front fender (rear end of fender section), 51: Storage compartment, 51r: Rear end of storage compartment, 99: Electrical equipment, FR: Front wheel, R: Riding space

What is claimed is:

1. A peripheral structure of a front hood of a vehicle, comprising:
    an instrument panel being arranged in a front part of a riding space and comprising a first surface facing the riding space and a second surface extending diagonally forwardly and downwardly from an upper end of the first surface; and
    an openable and closable or detachable front hood extending forwardly of the second surface and covering from above a storage compartment which is arranged in front of the riding space and between a pair of left and right front wheels;
    wherein the instrument panel comprises an extension section being located along the second surface and extending diagonally forwardly and downwardly under a rear end of the front hood, and a step section is provided at a front end portion of the extension section and projects more upwardly than an upper surface located in the rear of the front end portion.

2. The peripheral structure of a front hood of a vehicle according to claim 1, further comprising:
    a front fender comprising a pair of left and right fender sections located adjacent to left and right lateral ends of the front hood and configured to cover the pair of left and right front wheels from above, and the storage compartment connecting integrally and continuously the pair of left and right fender sections,
    wherein rear ends of the pair of left and right fender sections of the front fender are arranged continuously and side by side with the rear end of the front hood in the vehicle width direction, and the front end portion of the extension section of the instrument panel is arranged under the rear ends of the pair of left and right fender sections and the rear end of the front hood,
    wherein the step section extends continuously in the vehicle width direction, and at least both ends in the vehicle width direction of the step section are covered with the pair of left and right fender sections in a top plan view, and wherein at least a rear end of the storage compartment around the middle in the vehicle width direction thereof is located under the second surface, and both end portions in the vehicle width direction of the storage compartment which overlaps with the step section in a top plan view are positioned inwardly from both ends in the vehicle width direction of the step section.

3. The peripheral structure of a front hood of a vehicle according to claim 2, further comprising:
    electrical equipment which is arranged in a rear lower position of at least one of the pair of left and right fender sections, wherein the extension section of the instrument panel extends above and forwardly of the electrical equipment under the fender section.

4. The peripheral structure of a front hood of a vehicle according to claim 1, wherein the second surface of the instrument panel is formed in a convex shape which projects diagonally forwardly and upwardly at the middle in the vehicle width direction.

5. The peripheral structure of a front hood of a vehicle according to claim 2, wherein the front fender is arranged adjacent to the left and right lateral ends of the front hood, and each of the front hood and the front fender extends continuously in the diagonally forward and downward direction from the rear end to a front end thereof.

6. A peripheral structure of a front hood of a vehicle, comprising:
    instrument housing means for housing instrumentation, the instrument housing means being arranged in a front part of a riding space and comprising a first surface facing the riding space and a second surface extending diagonally forwardly and downwardly from an upper end of the first surface; and
    front covering means being openable and closable or detachable and extending forwardly of the second surface and for covering from above a storing means which is arranged in front of the riding space and between a pair of left and right front wheels;
    wherein the instrument housing means comprises an extension section being located along the second surface and extending diagonally forwardly and downwardly under a rear end of the front hood, and a step section is provided at a front end portion of the extension section and projects more upwardly than an upper surface located in the rear of the front end portion.

7. The peripheral structure of a front hood of a vehicle according to claim 6, further comprising:
    wheel covering means comprising a pair of left and right fender sections located adjacent to left and right lateral ends of the front hood and for covering the pair of left and right front wheels from above, and the storing means connecting integrally and continuously the pair of left and right fender sections, wherein rear ends of the pair of left and right fender sections of the wheel covering means are arranged continuously and side by side with the rear end of the front hood in the vehicle width direction, and the front end portion of the extension section of the instrument housing means is arranged under the rear ends of the pair of left and right fender sections and the rear end of the front covering means, wherein the step section extends continuously in the vehicle width direction, and at least both ends in the vehicle width direction of the step section are covered with the pair of left and right fender sections in a top plan view, and wherein at least a rear end of the storing means around the middle in the vehicle width direction thereof is located under the second surface, and both end portions in the vehicle width direction of the storing means which overlaps with the step section in a top plan view are positioned inwardly from both ends in the vehicle width direction of the step section.

8. The peripheral structure of a front hood of a vehicle according to claim 7, further comprising: electrical equipment which is arranged in a rear lower position of at least one of the pair of left and right fender sections, wherein the extension section of the instrument housing means extends above and forwardly of the electrical equipment under the fender section.

9. The peripheral structure of a front hood of a vehicle according to claim 6, wherein the second surface of the instrument housing means is formed in a convex shape which projects diagonally forwardly and upwardly at the middle in the vehicle width.

10. The peripheral structure of a front hood of a vehicle according to claim 7, wherein the wheel covering means is arranged adjacent to the left and right lateral ends of the front covering means, and each of the front covering means and the wheel covering means extends continuously in the diagonally forward and downward direction from the rear end to a front end thereof.

* * * * *